United States Patent [19]

Newton

[11] 4,014,314

[45] Mar. 29, 1977

[54] SOLAR ENERGY COLLECTOR PANEL

[75] Inventor: T. Lawrence Newton, Atherton, Calif.

[73] Assignee: Sunburst Solar Energy, Inc., Menlo Park, Calif.

[22] Filed: May 8, 1975

[21] Appl. No.: 575,978

[52] U.S. Cl. .............................. 126/271; 165/162; 165/172

[51] Int. Cl.² .......................................... F24J 3/02

[58] Field of Search ................. 165/162, 163, 172; 122/247, 248, 249, 250 R; 126/270, 271

[56] References Cited

UNITED STATES PATENTS

| | | | |
|---|---|---|---|
| 787,495 | 4/1905 | Burnell et al. ...................... | 122/250 |
| 1,747,826 | 2/1930 | Gould ................................... | 126/271 |
| 2,277,921 | 3/1942 | McCullough et al. ............. | 165/172 |
| 2,402,326 | 6/1946 | Harkness ............................. | 126/271 |
| 3,299,881 | 1/1967 | Koch ................................... | 126/271 |
| 3,390,672 | 7/1968 | Snelling ............................... | 126/271 |
| 3,677,339 | 7/1972 | Perrin et al. ........................ | 122/250 |
| 3,823,703 | 7/1974 | Lanciault ............................. | 126/271 |

*Primary Examiner*—Kenneth W. Sprague
*Attorney, Agent, or Firm*—Julian Caplan

[57] ABSTRACT

A collector panel for thermal energy emanating from the sun comprises a coiled length of tubing arranged in a planar toroid and held in that position by a plurality of radial clamps. The tubing is continuous and carries the fluid to be heated, typically water from a swimming pool or similar container, in a spiral path in the plane of the collector. The collector is inclined at an angle to the vertical, orthogonal to the mean incidence of sunshine at the location of installation.

6 Claims, 4 Drawing Figures

SOLAR ENERGY COLLECTOR PANEL

BACKGROUND OF THE INVENTION

This invention relates to collector panels for the thermal energy emanating from the sun disk. It relates, more particularly, to such panels adapted to heating water, or other fluid substances, pumped through a single, sinuous conduit.

There are many devices in the prior art aimed at the collection of solar energy for water heating and other purposes. Such devices commonly employ planar collector panels over which the fluid to be heated is allowed to flow under gravitational forces in a continuous sheet, or in parallel enclosed passages inclined to the vertical.

The devices of the prior art are generally strongly sensitive to variations in the angle of incidence through the diurnal cycle and require either continuous realignment with the sunlight vector, or sacrifice heating efficiency.

The devices of the prior art are also generally fabricated assemblies in which headers, flow passages, collector surfaces and other components are assembled into a structure of some complexity and substantial cost.

It is, therefore, a primary object of the invention to teach the construction and use of a solar energy collector adapted to the heating of fluid substances which are simple in construction, require no fabricated flow passages and maintain a constant collection efficiency independent of the angle of incidence of solar radiation.

It is a further object of the invention to teach the construction of a solar collector, as hereinabove described, in which the collecting surface is composed of a continuous length of fluid conveying tubing coiled into a planar toroid.

SUMMARY

The invention attains its objects, and other objects and advantages which will become apparent in the detailed description of its preferred embodiment below, by providing a flow channel of a single length of elongated, fluid-carrying tubing, wound into a toroidal solar collector panel.

The fluid-bearing tubing may typically be of plastic or metal construction and range from ½ to 1 inch in internal diameter. The collector panel is typically several feet in diameter and presents a collecting surface, when projected onto a flat plane, of 10 square feet or more. Because the surface of the panel is composed of the upper circumference of substantially tubular flow channels, the effective collection surface is larger than the projected area of the panel.

Because of the circular, shallow spiral of the tubing forming the collector panel, the effective collection surface is independent of the angle of incident solar radiation, once the plane of the collector has been aligned with the local mean solar radiation vector, the value of which may readily be determined by reference to architectural textbooks and other sources of appropriate information. This angle of incidence will typically vary from 30 degrees to 90 degrees in geographic latitudes where solar energy collection is economically feasible; the above angeles being referenced to the local gravitational vector of the earth.

BRIEF DESCRIPTION OF THE ACCOMPANYING DRAWINGS

The preferred embodiment of the invention is shown in the accompanying drawings, in which.

DESCRIPTION OF THE PREFERRED EMBODIMENT

Figure 1:
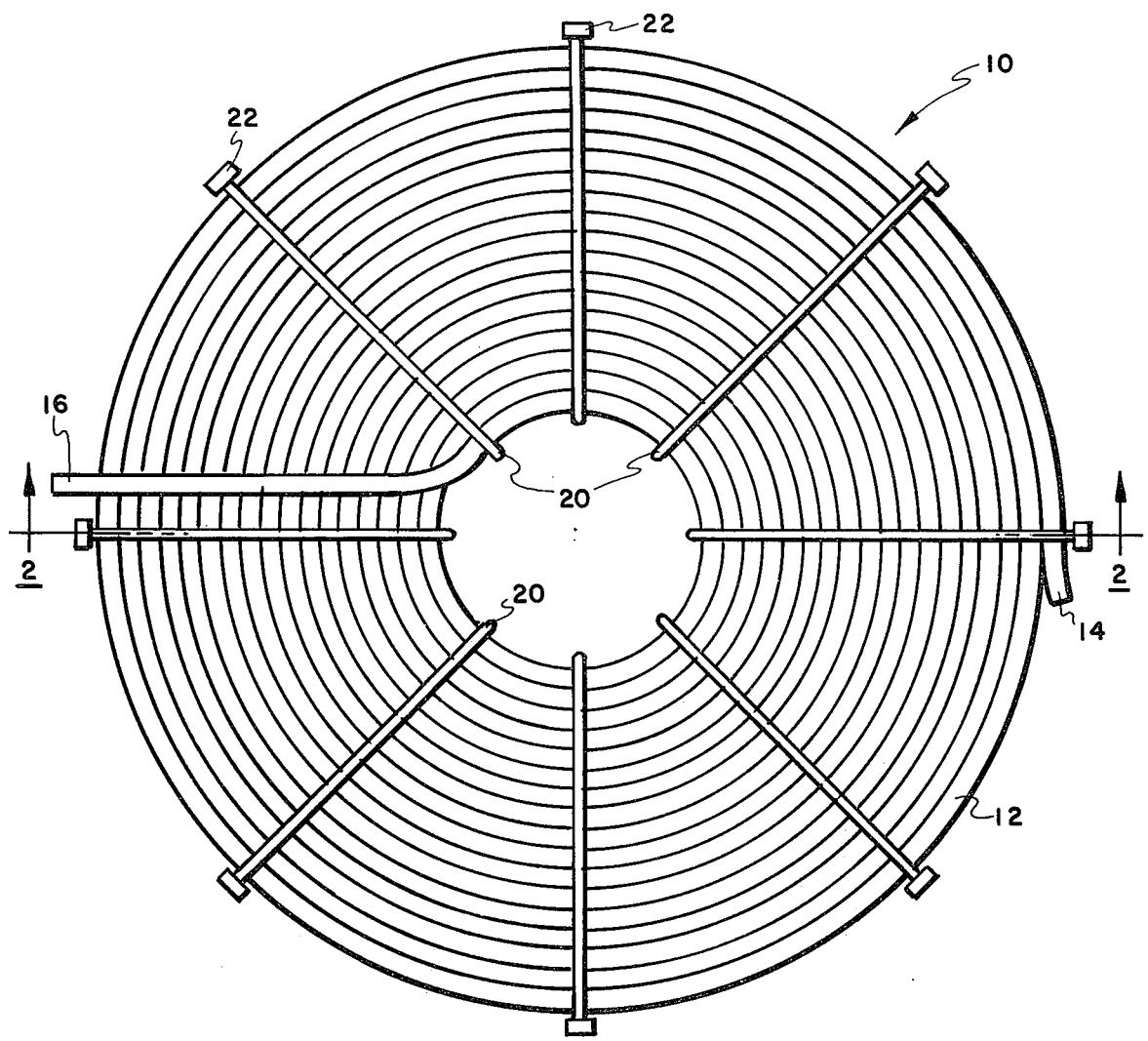
FIG. 1 is a frontal view of the solar energy collector of the invention.

The frontal view of FIG. 1 shows a solar energy collector 10 which is formed by coiling an elongated piece of cylindrical tubing 12 into a toroidal shape stiffened by a plurality of radial clamps 20 and end-pieces 22.

The tubing 12 is terminated external to the circumference of the collector panel 10 in a discharge stub 14 and an inlet 16 which extends, in substantially radial alignment, from the inner diameter of the toroid to the outer periphery.

The material of the tubing 12 may be chosen from several plastic and metal compositions readily available; polyethylene, polyvinyl-chloride, aluminum and copper compositions included. For the plastic compositions a darkened, semi-opaque finish is preferred to increase the collection efficiency for radiant heat emitted by the sun and to reduce aging from exposure to the ultraviolet end of the spectrum. For metallic compositions, darkened surface finishes, typified by black-anodized aluminum, are preferred to increase the coefficient of absorption of the collector.

The radial clamps 20 are rigid, elongated metal clamps, bent into U-shaped members whose internal spacing corresponds to the outer diameter of the tubing 12. The ends of the tines of clamps 20 are engaged by end-pieces 22 which prevent the discharge of tubing 12 from the outermost winding of the collector 10.

Figure 2:
FIG. 2 is a transverse section through the embodiment of FIG. 1, taken along section line 2—2 of that Figure.

FIG. 2 is a transverse section through the collector of FIG. 1, taken along section 2—2, and indicates the manner in which the tubing 12 is closely wound to form the collector panel, adjacent turns of the spiral winding being closely packed to present a continuous absorbing surface to incident radiation.

While no supporting structure is shown in FIGS. 1 and 2, an interconnecting frame may be provided, as desired, to rigidly interconnect the several clamps 20 into a self-supporting assembly and to provide support means for inclining the collector panel at the sun-receiving angle appropriate to its geographical location. When the panel 10 is laid directly on a planar surface, such as a roof, which is at the appropriate inclination with the mean solar vector and where one or more of the clamps 20 may be attached to the surface, a support structure as hereinabove described is not necessary.

The panel 10 is assembled, by preference, at the use site, the clamps 20 and the tubing 12 being delivered as separate items and wound into the toroidal collector immediately prior to final connection.

The collector panel 10 may be advantageously used to heat water for household use, by passing cool water through the coiled tubing 12 from inlet 16 to discharge 14 when sunlight is incident on the surface of the panel. It may also be utilized to provide heating for swimming pools and other water reservoirs which are to be maintained at a temperature above ambient.

Figure 3:
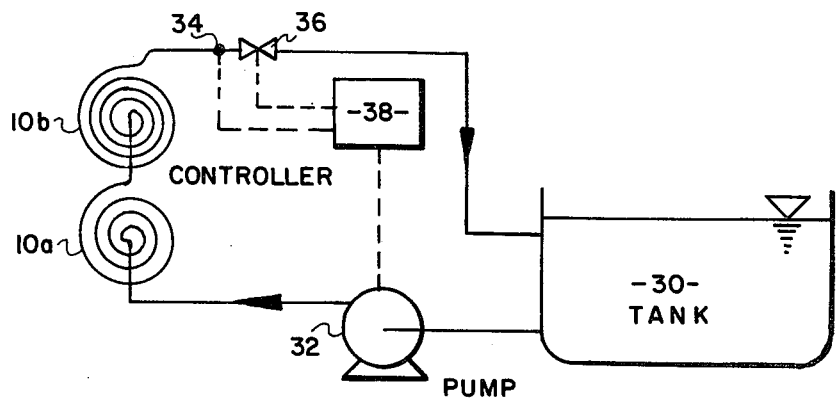
FIG. 3 is a schematic diagram of a heating system for swimming pools, employing two collector panels as shown in FIG. 1.

A typical installation of the type is shown in the schematic diagram of FIG. 3, employing two collecting panels 10a and 10b. A tank 30, suitably a swimming pool, supplies cool water to the inlet of pump 32; whence it is conveyed, under pressure, to the inlet of collector 10a. The water is heated in the first solar heating device and then passed to the intake of a second heating panel 10b, the discharge of which is routed back to the tank 30.

A valve 36 governs flow through the circuit and is, itself, controlled from a controller 38. A temperature sensing device 34 is installed near the discharge of solar collector 10b and provides information to the controller 38. A temperature sensing device 34 is installed near the discharge of solar collector 19b and provides information to the controller. Whenever the controller senses that water at the exit of panel 10b is at a temperature above a pre-set level, it opens the valve 36 and starts pump 32, thereby causing water from the pool to circulate through the heating system. With the exception of utilizing solar heat collectors 10a and 10b, the pool heating system is similar to conventional devices employing gas-fired heaters or other sources of thermal energy, commonly employed in maintaining swimming pools at a temperature level comfortable for use.

Figure 4:
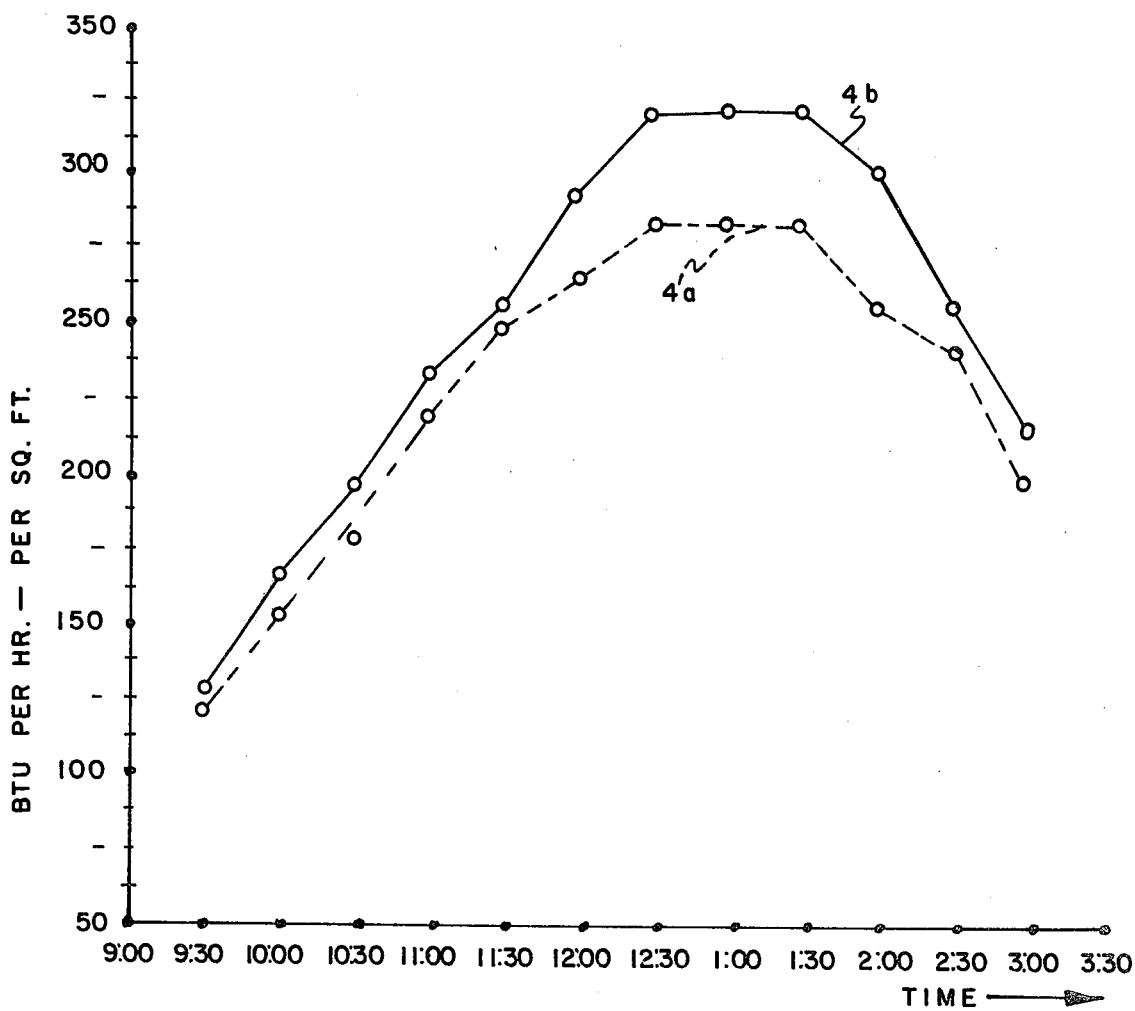
FIG. 4 is a graphical representation of the performance of the collector of the invention, compared to a directional device of the same effective area.

The superior heat gathering capability of the collector 10 of the invention is shown in the graphical presentation of FIG. 4. Graph 4b in that Figure shows the thermal input to a stream of water passing through a collector constructed according to the principles of the invention as a function of the time of day.

Another collector with identical surface and constructed from identical tubing, but aligned in a continuous path in a rectangular panel, was tested simultaneously with the spiral-wound solar panel and gave a performance shown in graph 4a; the flow of water and other operating parameters were identical for the two collectors, which also had identical surface areas exposed to sunlight.

The heat transferred to the heated medium, water in the tests shown in FIG. 4, amounted to 320 BTU/hr-sq.ft. for the spiral-wound configuration and to 282 BTU/hr-sq.ft. for the parallel flow-path configuration an effective increase of 13.6% for the solar panel of the invention per exposed unit area.

The superior performance of the collector 10 is evident at all times of exposure; the quoted figures represent the maximum heat received during the hours of most intense irradiation around noon — the reference times are for daylight saving time and show the maximum around 1 p.m.

A plurality of solar panels 10 may be manifolded into heating assemblies, with fluid flow in series or in parallel, to increase the heat absorbing capacity of the installation; the surface area of the panels may be varied by increasing or decreasing the length of tubing coiled to form a single collector panel; continuous lengths of tubing may be employed, or discrete lengths may be spliced together to form a continuous flow path in any single solar panel of the invention; and suitable support structures may be incorporated in the panel, or engage the clamps thereof. Such changes, and changes in the materials of construction and other details shall be deemed to lie within the invention as disclosed herein, delimited only by the appended claims.

I claim:

1. A solar heating panel for fluid heat transfer media, comprising:

an elongated, tubular flow channel of flexible, cylindrical tubing for said media, wound into a planar, continuous spiral substantially toroidal in outline and having an outer and inner diameter;

a plurality of radially disposed, angularly spaced apart, elongated clamps, restraining said flow channel in said planar configuration, each said clamp being U-shaped and having parallel arms and a connection between said arms, the internal spacing between said arms corresponding to the outer diameter of said channel, the connection of each said clamp engaging said channel at the inner diameter of said spiral, one said arm extending over the top of said spiral and the other said arm extending below said spiral; and inlet and outlet connections, communicating with either end of said channel, at the inner and outer peripheries thereof, respectively, for the admission and discharge of fluid heat transfer medium;

said panel having no enclosure for said channel other than said clamps.

2. The heating panel of claim 1 wherein said pair of elongated clamps is formed by bending a single element into a pair of coplanar arms and said connection.

3. The heating panel of claim 1, wherein said tubing is of a plastic composition.

4. The heating panel of claim 1 wherein said tubing is an aluminum composition, said tubing being provided with a darkened surface for the improvement of radiant heat reception.

5. The heating panel of claim 3, wherein said plastic composition is provided with a darkly translucent finish.

6. The heating panel of claim 1 which further comprises support means for said clamps, said support means being constructed to align the panel in a plane orthogonal to the local mean incident solar radiation vector.

* * * * *